(No Model.)
R. E. WHITMAN.
Saddle.
No. 236,923.    Patented Jan. 25, 1881.
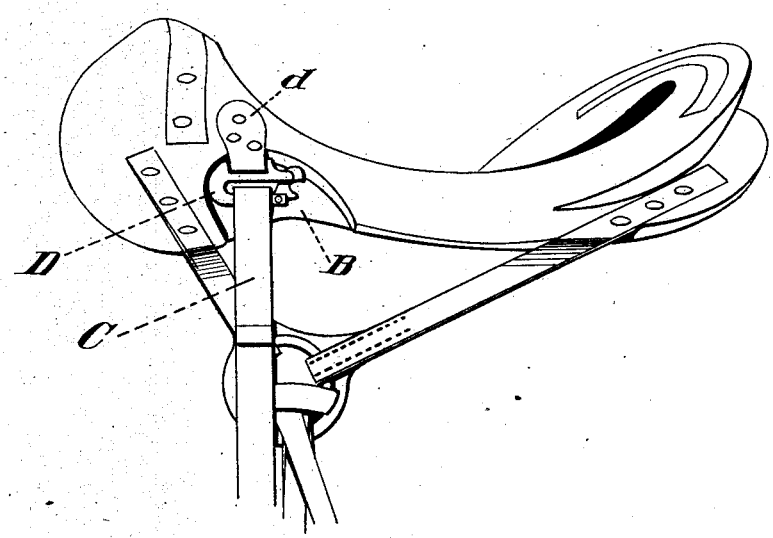
Witnesses,
N. H. Burrall
E. N. Smith
Inventor,
R. E. Whitman
by R. F. Hyde Atty

UNITED STATES PATENT OFFICE.

ROYAL E. WHITMAN, OF NEW YORK, N. Y.

SADDLE.

SPECIFICATION forming part of Letters Patent No. 236,923, dated January 25, 1881.

Application filed June 25, 1880. (No model.)

*To all whom it may concern:*

Be it known that I, ROYAL E. WHITMAN, a citizen of the United States, residing at New York city, State of New York, have invented a new and useful Improvement in Saddles, (for which no patent has been applied for nor obtained by me, nor others with my knowledge or consent, in any foreign country,) of which the following is a specification.

My invention relates to improvements in saddles, and has for its object the formation of an easier and more perfect seat for the rider through the construction of the tree and relative arrangement therewith of the stirrup-strap bar, by which the bar, as an excrescence upon the seat, or as a projection from it, is done away with. This object I accomplish by the means as illustrated in the accompanying drawing, in which the figure shown is a side view of a tree embodying my improvement.

B is a recess sunk in the seat-surface of the saddle at the point where the shank of the bar is commonly fastened. The shank *d* of the bar D is sunk in the saddle to be flush with its surface at a point above the recess B, to permit the bar D to extend into and lie flat within said recess, so that the bar D, with the stirrup-strap C, forms, in effect, a continuation of the surface of the saddle-seat.

In the drawing what is known as a "safety spring-bar" is shown recessed in the saddle, and the configuration of the recess is adapted to permit the strap C to take the angle necessary to free itself in case of accident.

When the ordinary plain or stiff bar is employed its shanks or legs are let into the saddle at the same point above the recess B at which the shank *d* is shown secured, and the bar proper is projected within the recess, to form with its strap a practical continuation of the seat.

The stirrup-bar, as heretofore applied to project below the edge of the tree, not only made a bunch to interfere with the perfect covering of the tree, but was of serious disadvantage to the rider in being a hard projection, tending to prevent the knee from coming close to the horse to secure a firm seat, as well as a metallic angle to wear the clothing; and although this invention is peculiarly applicable to that class of saddle formed of the uncovered tree, or of the partially-covered tree, or of the covered tree without flaps, such as the present United States army and many jockey saddles, it may also be employed to advantage with the full-flap saddle by placing rivet-fastenings for the flap at points on the tree above the edge of the recess B, so that the flap may be turned up to expose it.

Now, having described my invention, what I claim is—

In a saddle-tree, the combination, with the recess B, of the bar D, relatively arranged therewith in the manner and for the purpose set forth.

ROYAL E. WHITMAN.

Witnesses:
WM. C. NORRIS,
H. D. VAN VLECK.